Aug. 26, 1958 T. S. NOSKOWICZ 2,849,646

COLOR CONVERGENCE SYSTEM

Filed Feb. 24, 1953 2 Sheets-Sheet 1

THEODORE S. NOSKOWICZ
*INVENTOR.*

BY Francis W. Crotty

HIS ATTORNEY.

THEODORE S. NOSKOWICZ
*INVENTOR.*
BY Francis W. Crotty
HIS ATTORNEY 2,849,646

COLOR CONVERGENCE SYSTEM

Theodore S. Noskowicz, Wood Dale, Ill., assignor to The Rauland Corporation, a corporation of Illinois Application February 24, 1953, Serial No. 338,200

4 Claims. (Cl. 315—13)

This invention pertains to a new and improved convergence system for a color-image reproducing device and is particularly directed to a convergence system for use in a reproducing device employing a direction-sensitive target activated by a plurality of electron beams.

A wide variety of image reproducing devices or kinescopes have been proposed and used for the reproduction of colored television images; one of the most widely known devices employs a direction-sensitive target structure selectively activated by a plurality of electron beams which impinge upon the target from different directions or angles. As originally generated, the electron beams of this type of reproducer are directed along parallel paths radially spaced in a substantially symmetrical pattern about a reference axis. The device includes a convergence system which causes the beams to be shifted from their original parallel paths and to converge at a predetermined point on or near a preselected portion of the target structure. The usual type of convergence system comprises a simple immersion lens which literally focuses the electron beams rather than simply deflecting or directing them toward the point of convergence. If it were possible to construct a distortionless lens of practical dimensions, this system would be highly satisfactory; however, electron lenses of acceptable size are normally subject to inherent spherical aberration. As a result, the electron beams are diverted toward the convergence point but at the same time the cross-sectional configuration of each of the beams is distorted, and instead of impinging upon the normally desired circular portion of the target structure the beams tend to become flattened and excite generally elliptical target areas. Similar distortion effects occur when beams of square, hexagonal, or other cross-sectional configuration are employed. This distortion may cause color contamination or fringing effects, and, in addittion, may reduce the light output of the image reproducing device.

It is an object of this invention, therefore, to provide a convergence system for a color-image reproducing device which overcomes the inherent spherical aberration and distortion present in known systems.

It is an additional object of the invention to provide a beam convergence system readily adaptable for dynamic convergence variations corresponding to changes in the desired convergence distance occurring during the scanning of different portions of a picture field.

It is a further object of the invention to provide a convergence system in which distortion of the cross-sectional configuration of a plurality of electron beams is minimized.

It is a corollary object of the invention to provide a convergence system for a color-image reproducing device which is susceptible of mass production manufacture and which is relatively economical to produce.

The convergence system of the invention is adapted for use in a color-image reproducing device including an electrode system for developing a plurality of electron beams and for projecting those beams along substantially parallel paths which are radially spaced in a substantially symmetrical pattern about a reference axis and extend through a scanning-deflection field space toward a target electrode. The convergence system comprises a first convergence-deflection structure mounted substantially within the beam-path pattern to one side of the scanning-deflection field space; means are provided for coupling this first convergence-deflection structure to a control-potential source. In addition, the convergence system includes a second convergence-deflection structure radially spaced about the reference axis beyond the beam-path pattern; this second structure substantially encompasses the first deflection-convergence structure and defines therewith a convergence field space encompassing a portion of each of the beam paths. Means are provided for coupling the second convergence-deflection structure to a second control-potential source to establish a transverse electrostatic field in the above-mentioned convergence field space for individually directing each of the electron beams toward a common point of convergence.

The features of the invention which are believed to be novel are set forth with particularity in the appended claims. The organization and manner of operation of the invention itself, together with further objects and advantages thereof, may best be understood by reference to the following description taken in conjunction with the accompanying drawings, in which:

Figure 1:
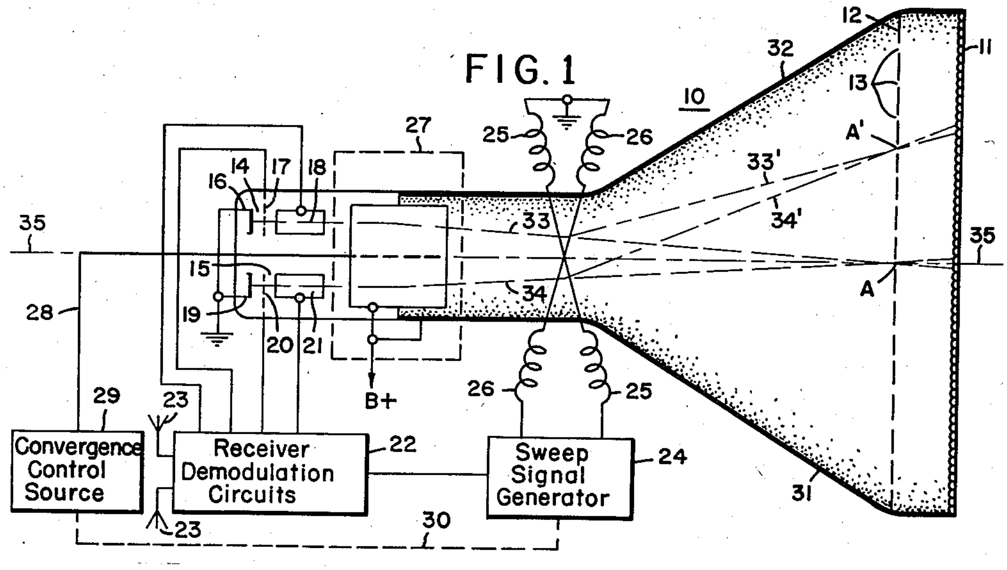
Figure 1 is a schematic representation of a color television receiver and image reproducing device incorporating the convergence system of the invention.

The television receiver illustrated in Figure 1 comprises an image reproducing device 10 including a target electrode 11 and a grid structure 12 mounted substantially parallel to the target electrode. Electrode 11 may be of any of the well known multi-color types, and includes a plurality of groups of elemental areas having different color-radiation characteristics in response to electron bombardment. In the usual case, the elemental areas are interspersed throughout the target electrode in a regular pattern which, for a three color system, may comprise the familiar dot-triad arrangement. Grid structure 12 is of the shadow-mask type and includes a plurality of apertures 13 generally corresponding to a single one of the elemental color area groups of electrode 11. Grid structure 12 and target electrode 11 together form a direction-sensitive target structure for the reproduction of color television images; it will be understood that they may be replaced by any of the many well-known target structures of this type, including those which comprise pyramidal surface targets and/or focusing grid structures, without in any way departing from the teaching of the invention.

Image reproducer 10 also includes means for developing a plurality of electron beams, which means are here represented as electron guns 14 and 15; although only two electron guns are shown in Figure 1, it is usually preferable to use at least three or more, the number of electron guns being equal to the number of different types of color area groups included in target 11. Electron gun 14 includes a cathode 16 connected to a source of reference potential, a control electrode 17, and a focusing system 18; the similar elements incorporated in electron gun 15 comprise cathode 19, control electrode 20 and focusing system 21. Control electrodes 17 and 20 and focusing systems 18 and 21 are all coupled to the demodulation circuits of the receiver, shown as unit 22, receiver unit 22 also being connected to an antenna 23. A sweep signal generator 24 is coupled between unit 22 and a scanning-deflection system comprising deflection coils 25 and 26. Demodulation unit 22, antenna 23, sweep signal generator 24, and deflection coils 25 and 26, as well as the component elements of electron guns 14 and 15, may be of any of the many suitable types known in the art; furthermore, deflection coils 25 and 26 may be replaced by an electrostatic deflection system if desired. Reproducer 10 also includes a convergence system 27, one part of which is coupled by means of a lead 28 to a convergence control source 29; convergence control source 29 may be coupled to sweep generator 24, as indicated by the broken lead line 30. Another element of convergence system 27 is coupled to a source of bias potential B+ which is also connected to an accelerating electrode 31; for the embodiment illustrated, electrode 31 comprises a conductive coating on the inner wall of the envelope 32 of reproducer 10.

With the exception of convergence system 27, all of the elements of image reproducing device 10 may be entirely conventional in form and in their manner of functioning; accordingly, a detailed description of the operation of the receiver is deemed unnecessary. Briefly, a telecast received at antenna 23 is translated and demodulated in unit 22, which may include such conventional circuit elements as a first detector, an intermediate-frequency amplifier, a second detector, and a synchronizing signal separator, as well as the necessary color-demodulation circuits. From the received telecast, unit 22 derives control signals which are applied to electrodes 17 and 20 to modulate the intensity of a pair of electron beams 33 and 34 developed by electron guns 14 and 15. Unit 22 also includes means for developing suitable biasing potentials which are applied to systems 18 and 21 to focus beams 33 and 34. Beams 33 and 34 are projected along paths which, at the outset, are substantially parallel, and which are radially spaced about a reference axis 35 in a substantially symmetrical pattern. Beams 33 and 34 are then converged by system 27, as will be more completely explained hereinafter, and extend through a scanning-deflection field space defined by deflection coils 25 and 26. The electron beam paths continue toward target electrode 11, converging at a point A substantially coinciding with grid structure 12 and, thereafter, diverging slightly before impinging upon the target electrode.

The usual synchronizing pulses included in the received telecast are separated in unit 22 and are applied to sweep generator 24, which develops suitable scanning control signals and supplies those signals to deflection coils 25 and 26. The scanning signals are utilized in coils 25 and 26 to develop a suitable scanning-deflection field for deflecting beams 33 and 34 across the face of electrode 11 to form a suitable raster, in the usual manner. A pair of alternate beam paths 33' and 34' represent electron beams 33 and 34 in one of their deflected positions, in which they converge at a point A'. Apertures 13 in grid structure 12 restrict each of the electron beams so that they impinge upon only a particular one of the different color area groups of target electrode 11 in accordance with known shadow-mask techniques.

Figure 2:
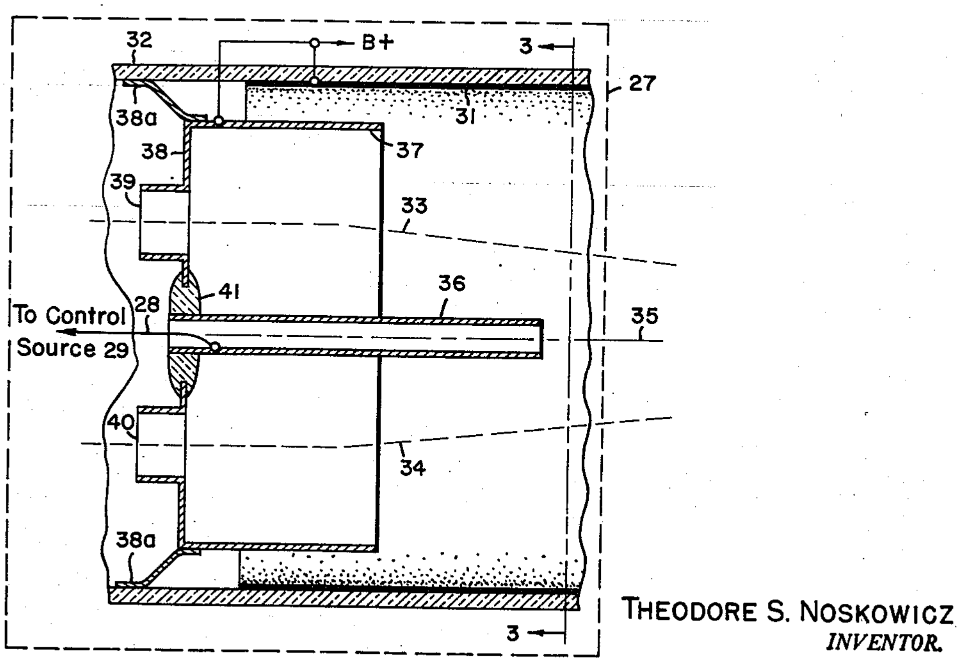
Figure 2 is an enlarged sectional view of a portion of the apparatus of Figure 1.

Figure 2 shows an enlarged sectional view of convergence system 27, including portions of envelope 32 and conductive coating 31. As seen therein, convergence system 27 comprises a first convergence structure 36 which is mounted substantially within the pattern formed by beams 33 and 34; for the embodiment shown, structure 36 comprises a tubular conductive element which is mounted symmetrically about axis 35. A second deflection structure 37 is radially spaced about axis 35 beyond the paths of beams 33 and 34 in encompassing relation to tube 36; structure 37 comprises a conductive cylinder, concentric with tube 36, and a wall 38 including a pair of apertures 39 and 40 through which beams 33 and 34 pass. Structure 37 is secured to tube 36 by an insulating bushing 41, which may be formed from glass or any other suitable material. Deflection structures 36 and 37 may be mounted in neck 32 by means of a plurality of spring clips 38*a*, as shown, or by any of the many other suitable means well known in the art.

Figure 3:
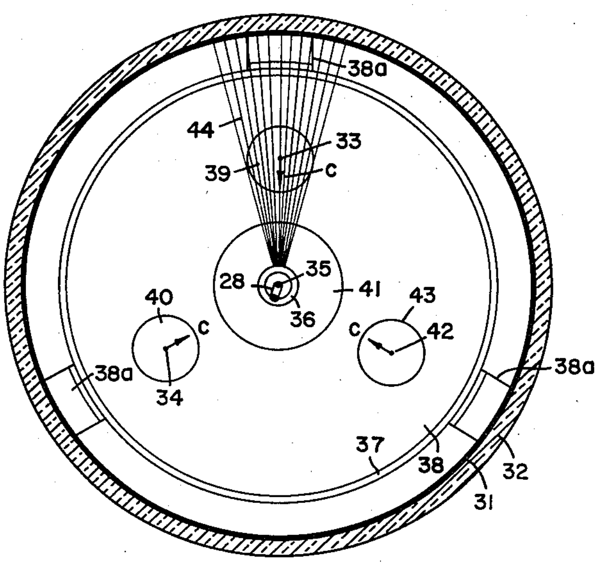
Figure 3 is an end view of the apparatus of Figure 2 taken along line 3—3.

The geometrical arrangement of convergence system 27 may be more completely understood by reference to Figure 3, which shows the third electron beam 42 used in conjunction with beams 33 and 34 in a tri-color system; as indicated, the three electron beams, or their paths, are radially spaced about axis 35 in a substantially symmetrical pattern. Figure 3 clearly indicates the encompassing relation of the second convergence-deflection structure, comprising cylinder 37 and plate 38, with respect to tube 36 and the paths of beams 33, 34 and 42. Plate 38 is, of course, provided with an additional aperture 43 through which electron beam 42 passes.

When the receiver of Figure 1 is placed in operation, a first control potential developed in source 29 is applied to tube 36 through lead 28; at the outset it is assumed that this is a constant-level biasing potential. A second control potential derived from source B+ is applied to convergence-deflection structure 37 and to conductive coating 31, which, in the region of convergence system 27, may be considered as an extension of cylinder 37. For one experimental system, the potentials applied to convergence-deflection structures 36 and 37 were of the order of 20 and 19 kilovolts respectively. The potential difference between the two deflection structures creates a transverse electrical field in the field space defined by tube 36, cylinder 37, and coating 31. The general directional characteristics of this field are shown in Figure 3 by the series of lines 44 between cylinder 36 and the two outer members of the system. As indicated in Figure 2, this transverse field deflects the electron beams toward axis 35, the direction of deflection generally being indicated in Figure 3 by arrows C. The three electron beams are deflected by equal amounts and converge at point A on axis 35 (Figure 1), the convergence distance from system 27 being controlled by varying the effective potential difference between cylinder 37 and tube 36.

In the foregoing discussion, it was assumed that source 29 provided a constant bias potential; however, it may be preferable to apply a dynamic correction factor to this control potential in order to compensate for the different convergence distances required as the electron beams scan target electrode 11. For example, it is apparent that the distance from convergence system 27 to convergence point A' is greater than the distance to convergence point A. Correction for this variation is accomplished by providing a variable control-potential source in unit 29 and controlling the potential applied to deflection tube 36 in synchronism with variations in the beam positions. This control synchronism is effected by coupling the convergence control source to sweep generator 24 so that the sweep signals applied to deflection coils 25 and 26 may also be used to control variations in the potential applied to tube 36.

Figure 4:
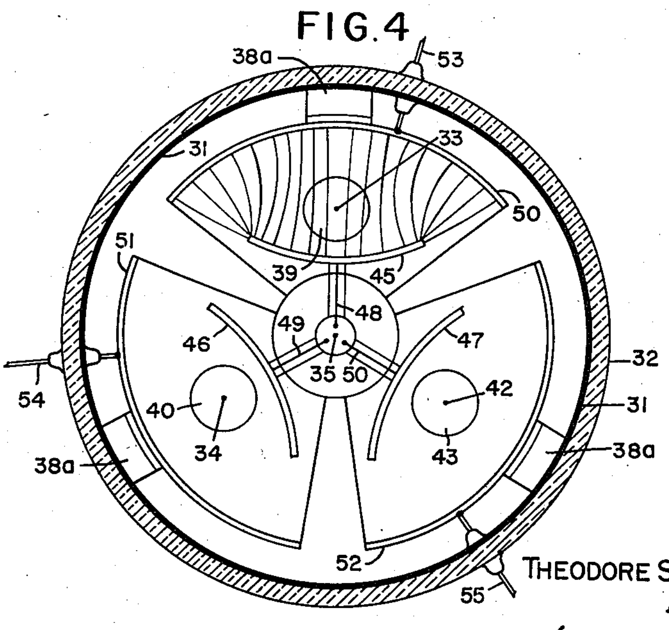
Figure 4 shows a different embodiment of the invention as viewed from the same aspect as Figure 3.

Another embodiment of the invention is shown in Figure 4, in which the first or inner convergence-deflection structure comprises three deflection plates 45, 46 and 47 which are mounted within the beam pattern adjacent to the paths of beams 33, 34 and 42 respectively. Deflection elements 45, 46 and 47 are provided with individual leads 48, 49 and 50 respectively, the leads being suitably insulated from each other. In this structure, cylinder 37 is replaced by three cylindrical segments 50, 51 and 52 transversely aligned with deflection elements 45, 46 and 47 respectively; elements 50–52 define a second convergence-deflection structure radially spaced about axis 35 beyond the pattern of the electron beams and substantially encompassing the first deflection structure. Cylindrical segments 50, 51 and 52 are provided with separate control leads 53, 54 and 55 respectively.

In all material respects, the apparatus of Figure 4 functions in a manner similar to that of the system of Figures 2 and 3. Again, a potential difference is established between the elements of the first deflection structure and those of the second deflection structure and this potential difference creates an electrostatic field, the general configuration of which is illustrated by the lines drawn between elements 45 and 50. The sectionalization of the two deflection-convergence structures permits individual adjustment of the deflection fields applied to beams 33, 34 and 42 and thus permits electrical correction for any mechanical or electrical differences in the electron guns producing those beams. In addition, this structure provides for a more uniform electrical field across each of the electron beam paths and thus minimizes any possible distortion of the cross-sectional beam configuration which might result from a non-uniform field.

The foregoing detailed specification of the invention describes an image reproducing device which generates a plurality of physically separate electron beams, co-existent in time. A well known variation of this type of device comprises a single electron gun which develops one electron beam; the beam is diverted at regular time intervals to a plurality of positions or paths radially spaced in a substantially symmetrical pattern about a reference axis and is subsequently converged toward a common point of convergence on or near the tube screen. Insofar as the present invention is concerned, the latter device is fully equivalent to one employing three separate electron guns; the plurality of electron beams referred to herein and in the appended claims may either be physically or time-sequentially separated from each other. In either case, the convergence system of each of the embodiments described above eliminates any necessity for electron lenses or similar focusing arrangements for converging the electron beams and replaces the usual lens with a simple deflection system. Accordingly, the spherical aberration and distortion of the electron lens system is effectively avoided. It should be noted that the invention is not confined to a tri-color system, but may be used in conjunction with any multi-color or other television reproducer in which a plurality of electron beams are originally projected along substantially parallel paths grouped about a reference axis and must subsequently be converged toward a common point.

While particular embodiments of the present invention have been shown and described, it is apparent that changes and modifications may be made without departing from the invention in its broader aspects. The aim of the appended claims, therefore, is to cover all such changes and modifications as fall within the true spirit and scope of the invention.

I claim:

An image reproducing device including: an electrode system for developing a plurality of electron beams having predetermined focal lengths and projecting said beams along substantially parallel paths radially spaced in a substantially symmetrical pattern about a reference axis and extending through a scanning-deflection field space toward a target electrode; a first convergence-deflection structure mounted substantially within said beam-path pattern intermediate said electrode system and said scanning-deflection field space; means for coupling said first convergence-deflection structure to a first control-potential source; a second convergence-deflection structure radially spaced about said reference axis beyond said beam-path pattern in substantially encompassing relation to said first deflection structure and defining therewith a convergence field space encompassing a portion of each of said beam paths; and means for coupling said second convergence-deflection structure to a second control-potential source to establish in said convergence field space a transverse electrostatic field for individual directing each of said electron beams toward a common point of convergence without substantially changing said focal lengths of said beam.

2. An image reproducing device including: an electrode system for developing a plurality of electron beams having predetermined focal lengths and projecting said beams along substantially parallel paths radially spaced in a substantially symmetrical pattern about a reference axis and extending through a scanning-deflection field space toward a target electrode; a first convergence-deflection structure comprising a conductive tube centered about said reference axis and mounted intermediate said electrode system and said scanning-deflection field space; means for coupling said first convergence-deflection structure to a first control-potential source; a second convergence-deflection structure radially spaced about said reference axis beyond said beam-path pattern in substantially encompassing relation to said first deflection structure and defining therewith a convergence field space encompassing a portion of each of said beam paths; and means for coupling said second convergence-deflection structure to a second control-potential source to establish in said convergence field space a transverse electrostatic field for individually directing each of said electron beams toward a common point of convergence without substantially changing said focal lengths of said beam.

3. A color-image reproducing device including: an electrode system for developing a plurality of $n$ electron beams having predetermined focal lengths and projecting said beams along $n$ substantially parallel paths radially spaced in a substantially symmetrical pattern about a reference axis and extending through a scanning-deflection field space toward a target electrode; a first convergence-deflection structure mounted substantially within said beam-path pattern intermediate said electrode system and said scanning-deflection field space; means for coupling said first convergence-deflection structure to a first control-potential source; a second convergence-deflection structure including $n$ deflection plates radially spaced about said reference axis beyond said beam-path pattern in substantially encompassing relation to said first deflection structure and defining therewith $n$ convergence field spaces each encompassing a portion of a selected one of said beam paths; and means for coupling each of said deflection plates of said second convergence-deflection structure to a second control-potential source to establish in each of said convergence field spaces a transverse electrostatic field for individually directing each of said electron beams toward a common point of convergence without substantially changing said focal lengths of said beams.

4. A color-image reproducing device including: an electrode system for developing a plurality of $n$ electron beams having predetermined focal lengths and projecting said beams along $n$ substantially parallel paths radially spaced in a substantially symmetrical pattern about a reference axis and extending through a scanning-deflection field space toward a target electrode; a first convergence-deflection structure including $n$ deflection plates symmetrically arranged about said reference axis and mounted substantially within said beam-path pattern intermediate said electrode system and said scanning-deflection field space; means for coupling said deflection plates of said first convergence-deflection structure to a first control-potential source; a second convergence-deflection structure radially spaced about said reference axis beyond said beam-path pattern in substantially encompassing relation to said first deflection structure and defining therewith $n$ convergence field spaces each encompassing a portion of a selected one of said beam paths; and means for coupling said second convergence-deflection structure to a second control-potential source to establish in each of said convergence field spaces a transverse electrostatic field for individually directing each of said electron beams toward a common point of convergence without substantially changing said focal lengths of said beams.

(References on following page)

References Cited in the file of this patent

UNITED STATES PATENTS

| | | |
|---|---|---|
| 2,005,330 | Sukumlyn | June 18, 1935 |
| 2,163,256 | Du Mont | June 20, 1939 |
| 2,412,965 | Chevigny | Dec. 24, 1946 |
| 2,452,919 | Gabor | Nov. 2, 1948 |
| 2,611,099 | Jenny | Sept. 16, 1952 |
| 2,619,608 | Rajchman | Nov. 25, 1952 |
| 2,672,574 | Evans | Mar. 16, 1954 |
| 2,679,614 | Friend | May 25, 1954 |
| 2,710,890 | Skellett | June 14, 1955 |
| 2,751,519 | Friend | June 19, 1956 |

OTHER REFERENCES

Friend, "Deflection and Convergence in Color Kinescopes," IRE Proceedings, vol. 39, October 1951, pp. 1261–1263.